United States Patent
Nakazawa et al.

(10) Patent No.: US 6,568,499 B2
(45) Date of Patent: May 27, 2003

(54) POWER STEERING SYSTEM FOR VEHICLES

(75) Inventors: Chiharu Nakazawa, Kawasaki (JP);
Toshimitsu Sakaki, Kanagawa (JP);
Mitsuo Sasaki, Kanagawa (JP);
Tadaharu Yokota, Kanagawa (JP);
Masakazu Kurata, Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/986,038

(22) Filed: Nov. 7, 2001

(65) Prior Publication Data

US 2002/0060104 A1 May 23, 2002

(30) Foreign Application Priority Data

Nov. 21, 2000 (JP) .......................................... 2000-353725
Sep. 5, 2001 (JP) .......................................... 2001-268825

(51) Int. Cl.⁷ ................................................. B62D 5/08
(52) U.S. Cl. ........................ 180/422; 180/433; 180/442; 91/448
(58) Field of Search .................................. 180/442, 441, 180/421, 422, 433; 137/599, 11; 91/448, 444

(56) References Cited

U.S. PATENT DOCUMENTS

| | | | | |
|---|---|---|---|---|
| 3,878,763 A | * | 4/1975 | Lang | 91/391 R |
| 4,557,342 A | * | 12/1985 | Drutchas | 180/132 |
| 4,914,913 A | * | 4/1990 | St. Germain et al. | 60/384 |
| 5,535,845 A | * | 7/1996 | Buscher | 180/417 |
| 5,947,228 A | * | 9/1999 | Rolando | 180/417 |
| 6,012,541 A | * | 1/2000 | Nishioka et al. | 180/404 |
| 6,216,815 B1 | * | 4/2001 | Inaguma et al. | 180/441 |

FOREIGN PATENT DOCUMENTS

| | | |
|---|---|---|
| JP | 57-201767 | 12/1982 |
| JP | 59-118569 | 7/1984 |

* cited by examiner

*Primary Examiner*—Avraham Lerner
(74) *Attorney, Agent, or Firm*—Foley & Lardner

(57) ABSTRACT

A power steering system is provided which comprises a bypass conduit connecting between first and second communication conduits and having bypass conduit ports. A pair of valves disposed in the bypass conduit for selectively opening and closing the bypass conduit ports in response to the pressure fluid from the pressure source. The valves are adapted to provide communication between the first and second communication conduits when the hydraulic pressure source is inoperative.

24 Claims, 15 Drawing Sheets

POWER STEERING SYSTEM FOR VEHICLES

BACKGROUND OF THE INVENTION

The present invention relates in general to a power steering system for vehicles and particularly to a power steering system of the kind having a double-acting hydraulic cylinder which is operated to produce a steering assist force in accordance with a steering force applied to a steering wheel.

An example of a power steering system of the above described kind is disclosed in Japanese Patent Provisional Publication No. 59-118569. Another example is disclosed in Japanese Patent Provisional Publication No. 57-201767.

SUMMARY OF THE INVENTION

It is an object of the present invention to provide a power steering system which provides a steering feel which is not deteriorated by a road surface input, i.e., a sudden disturbance such as kickback applied to the system from the road surface.

It is a further object of the present invention to provide a power steering system of the foregoing character which can be operated manually without requiring an excessively large steering force when an oil pump is inoperative and is therefore highly useful from a safety driving point of view.

It is a further object of the present invention to provide a power steering system of the foregoing character which is constructed so that an abnormality of the system can be recognized in a moment assuredly and is therefore desirable from a safety driving point of view.

It is a further object of the present invention to provide a power steering system of the foregoing character which can be obtained without requiring any expensive electromagnetic valve and therefore can be lower in cost.

To accomplish the above objects, there is provided according to an aspect of the present invention a power steering system for a vehicle comprising a hydraulic pressure source, a hydraulic cylinder having first and second chambers and driven in accordance with a pressure differential between a pressure fluid supplied to the first chamber and that to the second chamber, first and second communication conduits connecting the first and second chambers to the hydraulic pressure source, respectively, a controller for selectively switching a supply direction of the pressure fluid from the hydraulic pressure source to the first and second chambers of the hydraulic cylinder in response to a steering operation of a steering wheel, a bypass conduit connecting between the first and second communication conduits and having first and second bypass conduit ports, and first and second valves disposed in the bypass conduit for selectively opening and closing, in response to the pressure fluid from the pressure source, the first and second bypass conduit ports in such a manner that the pressure fluid from the hydraulic pressure source is supplied to the first chamber of the hydraulic cylinder while the pressure fluid in the second chamber of the hydraulic cylinder is discharged therefrom when the first valve is in a position of closing the first bypass conduit port and the second valve is in a position of opening the second bypass conduit port and the pressure fluid from the hydraulic pressure source is supplied to the second chamber of the hydraulic cylinder while the pressure fluid in the first chamber of the hydraulic cylinder is discharged therefrom when the first valve is in a position of opening the first bypass conduit port and the second valve is in a position of closing the second bypass conduit port, the first and second valves being placed in the positions of opening the first and second bypass conduit ports and thereby providing communication between the first and second communication conduits when the hydraulic pressure source is inoperative.

According to another aspect of the present invention, there is provided a power steering system for a vehicle comprising a double-acting hydraulic cylinder for controlling the direction of a pair of wheels of the vehicle, the hydraulic cylinder having first and second chambers and driven in accordance with a pressure differential between a pressure fluid supplied to the first chamber and that to the second chamber, and a hydraulic circuit for controlling supply and discharge of pressure fluid to and from the first and second chambers of the hydraulic cylinder, the hydraulic circuit including a hydraulic pressure source, a reservoir, and a pair of first and second valves, the first valve being disposed between the first chamber of the hydraulic cylinder and the reservoir for providing communication therebetween when open and thereby allowing discharge of the pressure fluid from the first chamber of the hydraulic cylinder and obstructing communication therebetween when closed and thereby allowing supply of the pressure fluid from the hydraulic pressure source to the first chamber, the second valve being disposed between the second chamber of the hydraulic cylinder and the reservoir for providing communication therebetween when open and thereby allowing discharge of the pressure fluid from the second chamber of the hydraulic cylinder and obstructing communication therebetween when closed and thereby allowing supply of the pressure fluid from the hydraulic pressure source to the second chamber of the hydraulic cylinder, the first and second valves being opened to communicate the first and second chambers of the hydraulic cylinder with the reservoir when the hydraulic pressure source is inoperative.

The other objects and features of this invention will become understood from the following description with reference to the accompanying drawings.

DESCRIPTION OF THE PREFERRED EMBODIMENTS

The power steering system of the Japanese Patent Provisional Publication No. 59-118569 encounters a problem that it has a possibility of requiring an undesirably increased steering effort and therefore causing a deteriorated steering feel when a disturbance due to a kickback or the like is suddenly inputted from a road surface to the power steering system. This is because in response to such a disturbance the directional control valve shuts off a bypass conduit and a closed hydraulic circuit may possibly result.

The power steering system of the Japanese Patent Provisional Publication No. 57-201767 encounters a problem that its bypass valve has a possibility of being locked in a position of closing a bypass conduit due to contaminants or the like intruded into the bypass valve. This leads to the necessity of an undesirably increased steering effort by the driver, thus inevitably causing a deteriorated steering feel.

Figure 1:
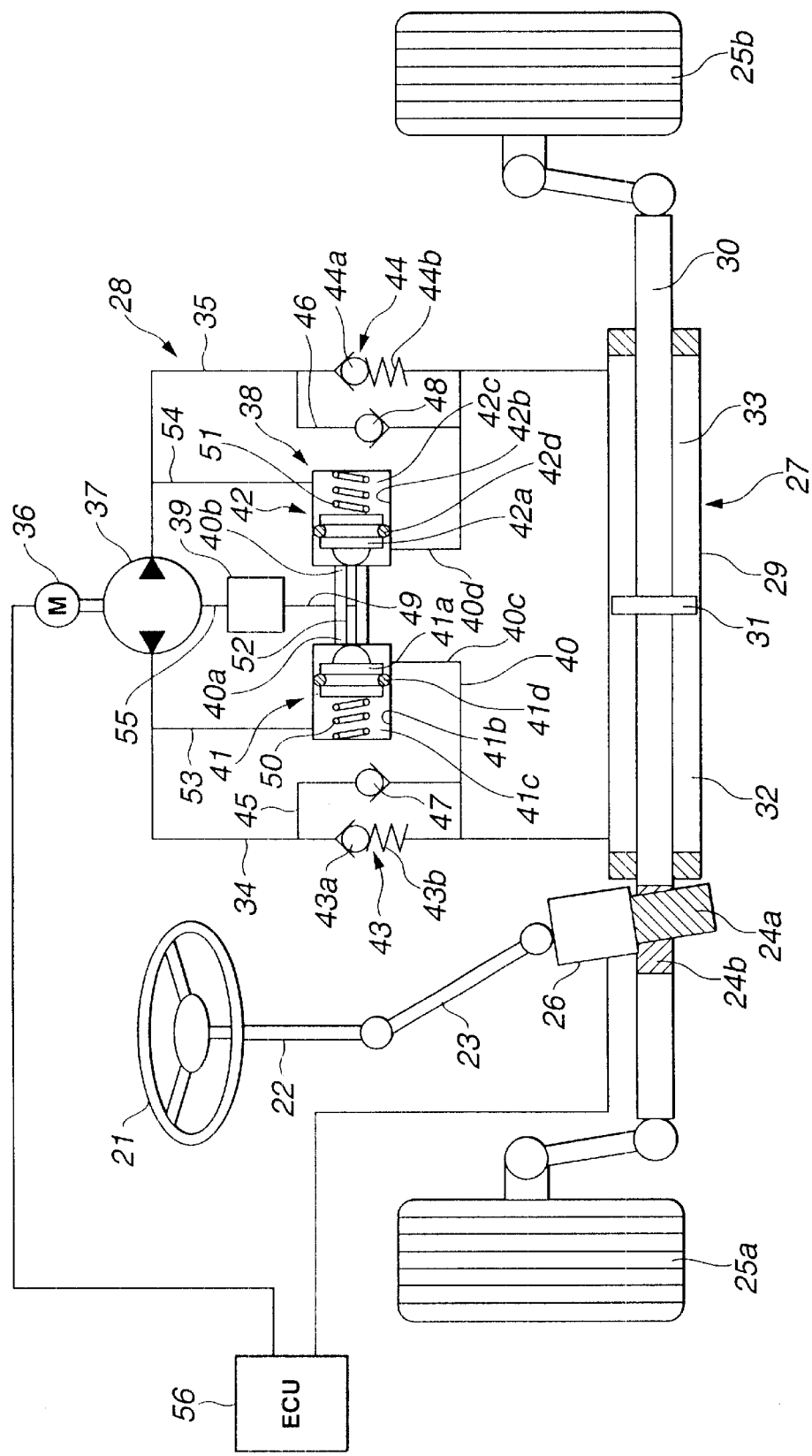
FIG. 1 is a schematic view of a power steering system according to a first embodiment of the present invention.

Referring now to FIG. 1, a power steering system according a first embodiment of the present invention includes steering wheel 21 drivingly connected to steering shaft 22 which is in turn drivingly connected at the lower end thereof to output shaft 23. Output shaft 23 has pinion 24a which meshes with steering rack 24b provided to piston rod 30. Detecting device 26 is provided to the lower end side of output shaft 23 for detecting a steering force applied to steering wheel 21 and a road surface input from front wheels 25a and 25b. Double-acting hydraulic cylinder 27 is operatively connected to rack 24b. Hydraulic circuit 28 controls supply and discharge of pressure oil to and from hydraulic cylinder 27.

Hydraulic cylinder 27 includes cylinder section 29 elongated in the vehicle width direction and piston rod 30 provided with rack 24b and extending through the inside of cylinder section 29. Fixedly attached to piston rod 30 is piston 31 which is slidable inside cylinder section 29. On opposite sides of piston 31 and inside cylinder section 29 are defined first and second chambers 32 and 33. Front wheels 25a and 25b are connected by way of links (no numeral) to the opposite ends of piston rod 30.

Hydraulic circuit 28 includes first and second communication conduits 34 and 35 which are fluidly connected at the first ends thereof to first and second chamber 32 and 33, reversible pump 37 fluidly connected to the second ends of first and second communication conduits 34 and 35 and rotatable in the forward and reverse directions by being driven by motor 36, release mechanism 38 disposed between first and second communication conduits 34 and 35 for releasing first and second chambers 32 and 33 under a predetermined condition, and reservoir 39 disposed upstream of reversible pump 37 and storing therewithin working oil.

Release mechanism 38 includes bypass conduit 40 connecting between communication conduits 34 and 35 for bypassing reversible pump 37, a pair of poppet valves 41 and 42 for opening and closing bypass conduit 40 for thereby providing and obstructing communication between first and second communication conduits 34 and 35, and a pair of pressure control valves 43 and 44 disposed in respective first and second communication conduits 34 and 35 and serving as differential pressure generating devices for generating pressure differentials by which poppet valves 41 and 42 are opened and closed.

Further, between bypass conduit 40 and each of first and second communication conduits 34 and 35 are disposed third and fourth communication conduits 45 and 46 for bypassing pressure control valves 43 and 44, respectively. Third and fourth communication conduits 45 and 46 are provided with check valves 47 and 48 which allow flow of pressure oil only in one direction, i.e., in the direction from first and second chambers 32 and 33 of hydraulic cylinder 27 to reversible pump 37.

Bypass conduit 40 has a central conduit section extending between poppet valves 41 and 42 and in communication with reservoir 39 by way of fifth communication conduit 49. The central conduit section are adapted to form at the opposite ends thereof first and second bypass conduit ports 40a and 40b.

Poppet valves 41 and 42 include valve bores 41b and 42b disposed nearly in series in bypass conduit 40. Poppet valves 41 and 42 further include cylindrical valve bodies 41a and 42a which are slidable within respective valve bores 41b and 42b. On rear sides of valve bodies 41a and 42a and within valve bores 41b and 42b are defined pressure actuating chambers 41c and 42c. Within pressure actuating chambers 41c and 42c are disposed springs 50 and 51 which serve as holding devices, respectively. Springs 50 and 51 are adapted to urge valve bodies 41a and 42a in the directions to close first and second bypass conduit ports 40a and 40b, respectively.

Valve bodies 41a and 42a are adapted to move within valve bores 41b and 42b depending upon the pressure differentials between oil pressures which are supplied from center side ends 40c and 40d of bypass conduit 40 to the insides of valve bores 41b and 42b to act upon the front ends of valve bodies 41a and 42a and oil pressures which are supplied from introduction conduits 53 and 54 to the insides of valve bores 41b and 42b to act upon the rear ends of valve bodies 41a and 42a. Valve bodies 41a and 42a have semispherical portions for engagement with and disengagement from bypass conduit ports 40a and 40b for thereby opening and closing the same. Valve bodies 41a and 42a are axially aligned with each other or disposed in series and connected at the semispherical portions by connecting rod 52 to constitute an integral unit.

Further, to the outer peripheries of valve bodies 41a and 42a are attached seal rings 41d and 42d, respectively.

Pressure actuating chambers 41c and 42c are connected by way of introduction conduits 53 and 54 to first and second communication conduits 34 and 35 at locations immediately downstream of reversible pump 37 such that oil pressure immediately downstream of reversible pump 37 is directly supplied to pressure actuating chambers 41c and 42c.

Pressure control valves 43 and 44 have ball valve bodies 43a and 44a which open and close reversible pump side open ends of first and second communication conduits 34 and 35. Further, pressure control valves 43 and 44 have return springs 43b and 44b which urge respective ball valve bodies 43a and 44a in the direction to close the reversible pump side open ends with a predetermined load. By the biasing force of each of return springs 43b and 44b, a pressure differential is generated between a pressure oil in a conduit portion upstream of each of pressure control valves 43 and 44 and a pressure oil in a conduit portion downstream of each of the pressure control valves 43 and 44.

Reservoir 39 supplies working or system oil stored therewithin to reversible pump 37 by way of supply conduit 55 and collects system oil leaking from various constituent parts of reversible pump 37.

Pump motor 36 are adapted to be driven in the forward and reverse directions by control current supplied thereto from electric controller 56 having a microcomputer. Controller 56 produces control current on the basis of signals such as a signal representative of a steering force applied to steering wheel 21 and detected by detecting device 26 and a signal representative of a road surface input from front wheels 25*a* and 25*b*.

The operation and effect of the first embodiment will now be described.

(a) At the Time of Both Poppet Valves Functioning Properly

Figure 2:
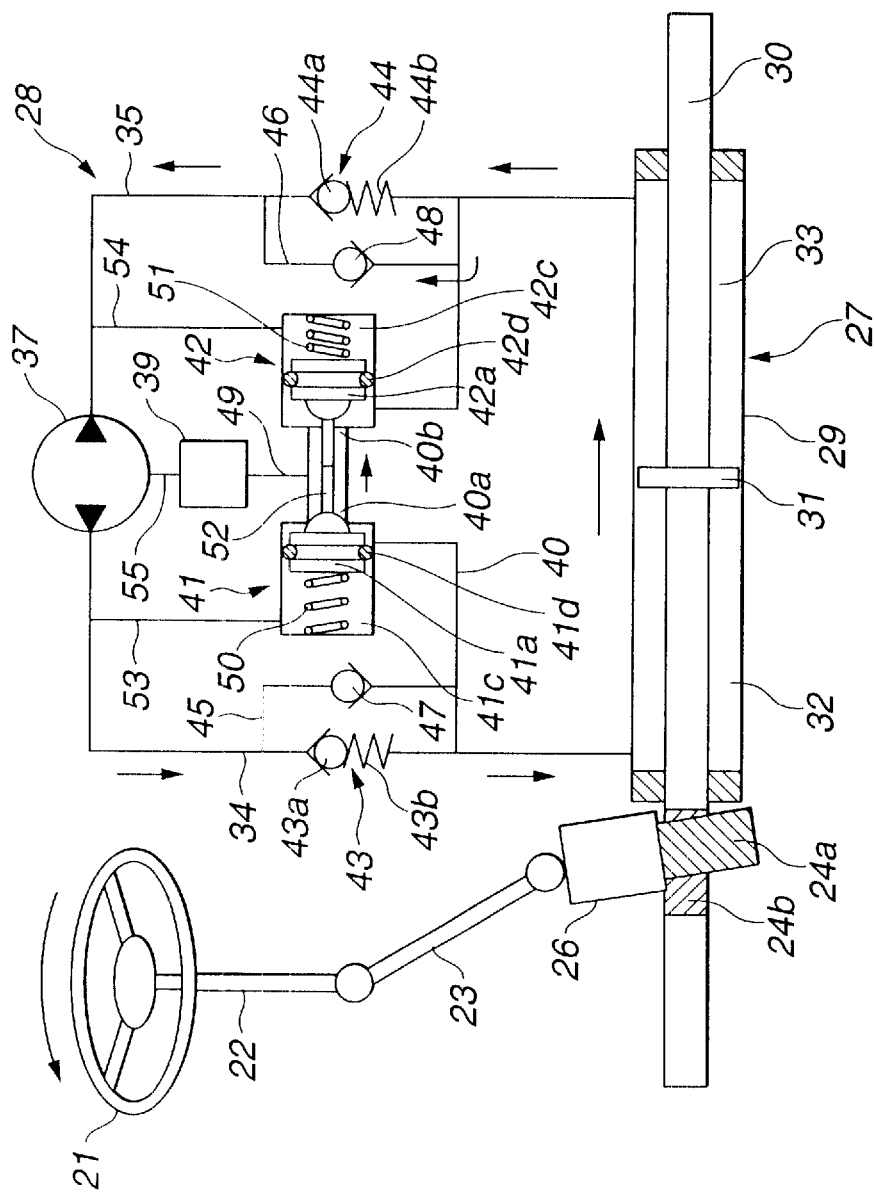
FIG. 2 is a view for illustrating an operation of the power steering system of FIG. 1 when a steering wheel is turned to the left.

Firstly, during usual driving of a vehicle, for example, when steering wheel 21 is turned by the driver to the left as shown in FIG. 2, pump motor 36 (refer to FIG. 1) is, for example, driven in the forward direction in response to a control signal from controller 56 (refer to FIG. 1), thus causing reversible pump 37 to be driven in the forward direction. By such a pumping operation, pressure oil is discharged from reversible pump 37 into first communication conduit 34, a part of which flows through introduction conduit 53 into pressure actuating chamber 41*c*. The pressure of oil having flowed into pressure actuating chamber 41*c* is higher than the pressure of oil having passed pressure control valve 43. This causes a difference between the pressures acting upon the opposite ends (i.e., front and rear ends) of valve body 41*a* of poppet valve 41, thus causing valve body 41*a* to move in the right-hand direction in FIG. 2 against the bias of spring 51 and close bypass conduit port 40*a*, while causing valve body 42*a* to open bypass conduit port 40*b*.

By this, the pressure oil discharged from reversible pump 37 pushes valve body 43*a* of pressure control valve 43 against the bias of return spring 43*b* and allow pressure control valve 43 to open and is thus supplied to first chamber 32 of hydraulic cylinder 27. Simultaneously, by a suction operation of reversible pump 37, pressure oil is caused to flow out from second chamber 33 of hydraulic cylinder 27 and drawn into second communication conduit 35. Then, pressure oil flows into bypass conduit 40 once and then into fourth communication conduit 46 to open check valve 48 and is drawn into reversible pump 37 through second communication conduit 35 as indicated by arrows in FIG. 2.

Accordingly, oil pressure is supplied to first chamber 32 of hydraulic cylinder 27, whereas oil pressure is discharged from second chamber 33, thus applying a steering assist force to the steering effort of the driver for turning steering wheel 21 to the left in FIG. 2. By this, a steering effort for turning steering wheel 21 to the left in FIG. 2 is reduced, thus making it possible to improve the operation ability of steering wheel 21.

In the meantime, in case the leftward steered condition is maintained, supply of current to pump motor 36 is cut off, thus causing hydraulic circuit 28 to be put into a closed condition. By this, oil pressure is kept applied to first chamber 32 of hydraulic cylinder 27.

Figure 3:
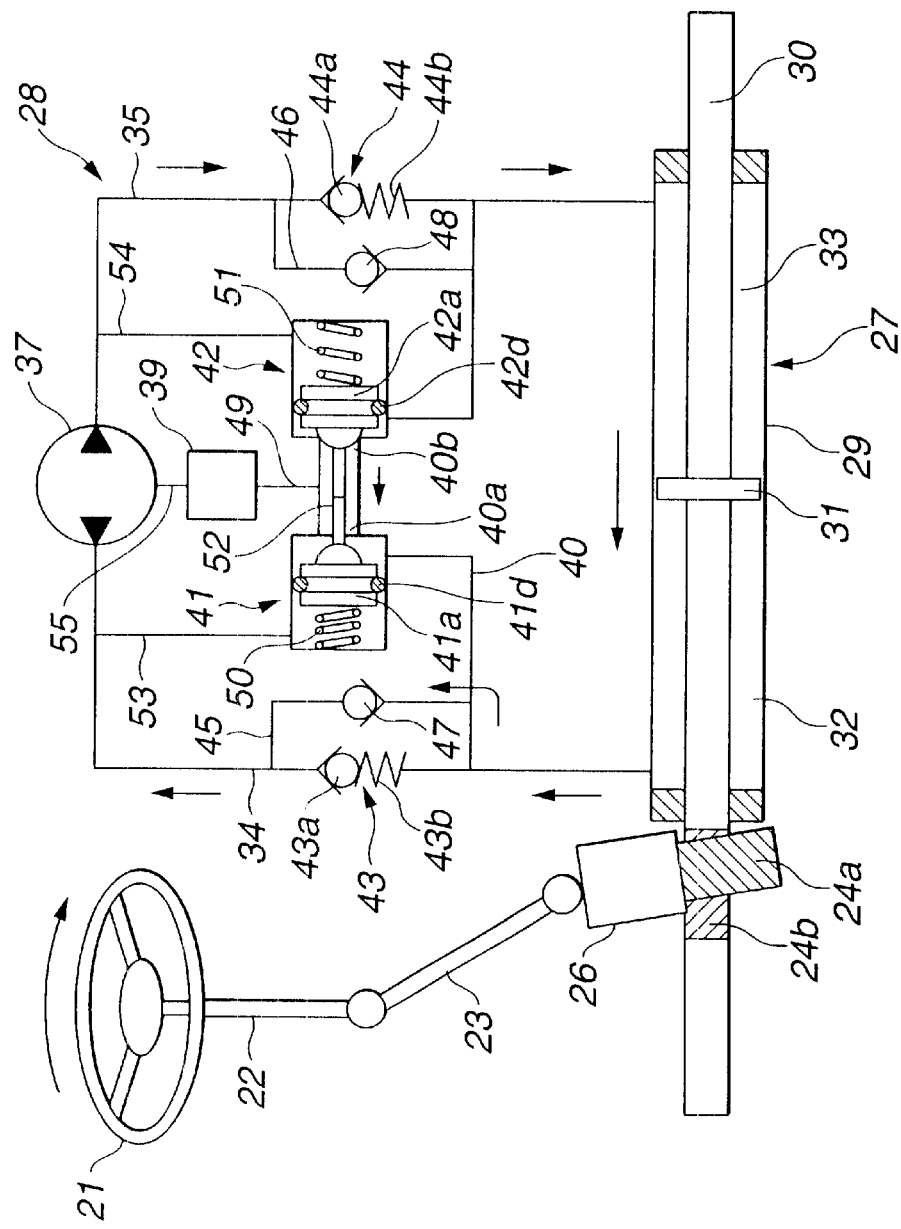
FIG. 3 is a view for illustrating an operation of the power steering system of FIG. 1 when the steering wheel is turned to the right.

On the other hand, when steering wheel 21 is turned from the leftward turned position back to a straight-ahead position and further turned to the right as shown in FIG. 3, pump motor 36 drives reversible pump 37 in the reverse direction in response to a signal from controller 56. By this, reversely to the manner as mentioned above, pressure oil is discharged into second communication conduit 35. Supply and discharge of pressure oil to and from first and second chambers 33 and 32 of hydraulic cylinder 27 is thus performed and an assist force is applied to a steering effort of a driver for turning steering wheel 21 to the right. By this, a steering effort required for turning steering wheel 21 to the right is reduced, thus making it possible to improve the operation ability of steering wheel 21.

(b) At the Time of a Failure of Oil Pump

In case reversible pump 37 is inoperative due to a failure such as an electric trouble of pump motor 36 or a mechanical trouble of reversible pump 37, oil pressure from reversible pump 37 is not supplied to introduction conduits 53 and 54 and to pressure actuating chambers 41*c* and 42*c*. Valve bodies 41*a* and 42*a* of poppet valves 41 and 42 are thus maintained in neutral positions shown in FIG. 1, i.e., in positions of opening bypass conduit ports 40*a* and 40*b* under the bias of springs 50 and 51. By this, bypass conduit 40 is put into an open condition, i.e., into a condition of providing communication between first and second communication conduits 34 and 35.

Accordingly, although a steering assist force is not obtained due to locking of reversible pump 37, steering wheel 21 can be turned manually without requiring an excessively large steering effort.

Further, in this instance, bypass conduit 40 is held in an open condition even when a sudden disturbance such as a kickback is supplied from the road surface to the power steering system and detecting device 26 detects such a kickback and supplies an information to controller 56, since oil pump 37 is inoperative. Thus, flow of pressure oil to and from first and second chambers 32 and 33 can be obtained without causing a large flow resistance.

Accordingly, a large increase of steering effort for turning steering wheel 21 can be prevented, thus making it possible to prevent the steering feel from being deteriorated.

In this connection, in the power steering system disclosed in Japanese Patent Provisional Publication No. 59-118569, the detecting device detects a disturbance such as a kickback from the road surface and supplies the electromagnetic directional control valve a signal for making the control valve shut off the bypass conduit. By this, the hydraulic circuit is put into a closed circuit condition when the oil pump is inoperative. Thus, supply and discharge of working to and from the first and second chambers of the hydraulic cylinder inevitably causes a large flow resistance, thus requiring a largely increased steering effort and therefore deteriorating the steering feel largely.

(c) When a Poppet Valve is Locked

In case one of valve bodies 41*a* and 42*a* in a condition of closing one of bypass conduit ports 40*a* and 40*b* is locked, for example, valve body 41*a* of poppet valve 41 in a condition of closing first bypass conduit port 40*a* as shown in FIG. 3 is locked, first bypass conduit port 40*a* is held closed from the first when steering wheel 21 is turned to the left. For this reason, an operation similar to that at the above described time (a), i.e., at the time of poppet valve 41 functioning properly is obtained, thus applying an assist force to a steering effort for turning steering wheel 21 to the left. By this, a steering effort required for turning steering wheel 21 to the left is reduced, thus making it possible to improve the operation ability of steering wheel 21.

However, since valve body 41*a* of poppet valve 41 is locked in a condition of closing first bypass conduit port 40*a* and valve body 41*a* is connected to valve body 42*a* by means of connecting rod 52, valve body 42*a* is in a condition of being incapable of closing second bypass conduit port 40*b* even when steering wheel 21 is turned to the right. For this reason, pressure oil discharged from reversible pump 37 into second communication conduit 35 passes second bypass conduit port 40*b* of bypass conduit 40 and is discharged through fifth communication conduit 49 into reservoir 39.

Accordingly, an assist force for assisting a steering force is not obtained, and a variation of steering feel is caused. This variation of steering feel can be recognized by a driver at once. By this, it is obtained such an effect that the driver can recognize a trouble of the power steering system based on such a variation of steering feel at once. In this connection, the power steering system of Japanese Patent Provisional Publication No. 57-201767 has one bypass valve disposed in the bypass passage. Such a bypass valve has a possibility of being locked in a closed condition due to contaminants or the like. The power steering system is constructed so that a steering assist force can be obtained even when the bypass valve is locked in a closed condition. This leads to a problem that a trouble or an abnormality of the power steering system cannot be recognized by the driver at once but with some delay. The power steering system of this invention is free from such a problem.

In the foregoing, it is to be noted that poppet valves 41 and 42 are not operated by using any electromagnetic valve which is expensive but by using a pressure differential between the pressure oil discharged by oil pump 37 and the pressure oil having passed pressure control valves 43 and 44, thus making it possible to reduce the cost.

It is further to be noted that pressure oil having flowed into the front end portions of valve bores 41b and 42b is returned into reservoir 39 by way of fifth communication conduit 49 and used as supplemental oil to be discharged by oil pump 37, thus making it possible to prevent occurrence of cavitation within oil pump 37 due to lack of working oil. Namely, in this embodiment, hydraulic circuit 28 is structured to be of a closed circuit. Thus, cavitation is apt to be caused when lack of oil within oil pump 37 is caused due to leakage of oil to the outside. However, the lack of oil can be supplemented by oil stored within reservoir 39 and supplied through supply conduit 55.

Reversely, in case the internal pressure within oil pump 37 becomes excessively high, the surplus of working oil can be released to reservoir 39 and oil leaking through small gaps between constituent parts of oil pump 37 can be collected, thus making it possible to suppress the load on oil pump 37 and attain efficient use of working oil.

It is further to be noted that check valves 47 and 48 provided to third and fourth communication conduits 45 and 46 do not have any biasing means such as springs, thus making it possible to prevent a large flow resistance from being caused when pressure oil flows in the direction from first and second chambers 32 and 33 to oil pump 37. Accordingly, a good suction operation of oil pump 37 can be attained and therefore oil pump 37 can be improved in responsiveness and reduced in load.

It is further to be noted that valves 41 and 42 are constructed to be of the poppet type. By this, bypass conduit 40 can be held in an open condition, i.e., in a condition of providing communication between first and second communication conduits 34 and 35 even when contaminant or the like got in between valve bodies 41a and 42a and bypass conduit ports 40a and 40b. This makes it assured to obtain manual steering of steering wheel 21 and therefore makes it possible to attain an improved safety in driving of a vehicle.

It is further to be noted that valve bodies 41a and 42a of poppet valves 41 and 42 are connected by connecting rod 52. By this, valve bodies 41a and 42a are movable as an integral unit, thus making it possible to attain opening and closing of respective first and second bypass conduit ports 40a and 40b assuredly.

It is further to be noted that pressure control valves 43 and 44 are constituted by valve bodies 43a and 44a in the form of ball and return springs 43b and 44b. Thus, pressure control valves 43 and 44 can be simple in structure and be produced with ease and at low cost.

It is further to be noted that first communication conduit 34 and second communication conduit 35 are provided with pressure control valves 43 and 44, and poppet valves 41 and 42 open and close bypass conduit 40 in response to oil pressures at conduit portions of first communication conduit 34 and second communication conduit 35 upstream of pressure control valves 43 and 44. This enables poppet valves 41 and 42 operate on the basis of oil pressures supplied thereto directly from reversible pump 37, thus making it possible to attain an improved responsiveness of poppet valves 41 and 42.

Referring to FIGS. 4 to 15, second to tenth embodiments will be described. In FIGS. 4 to 15, like parts and portions to those of the first embodiment described with reference to FIGS. 1 to 3 are designated by like reference characters and will be described to omit repeated description.

Figure 4:
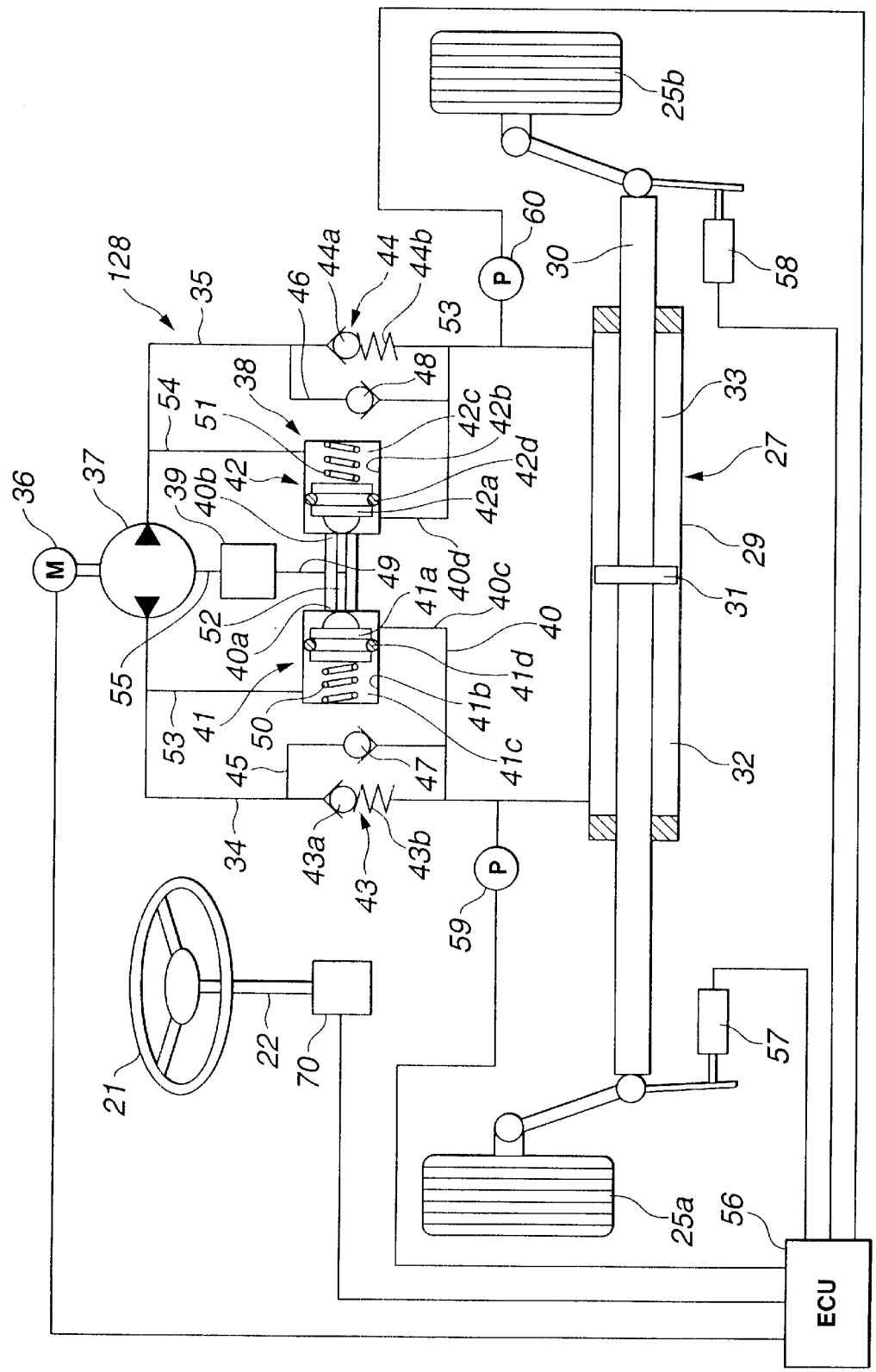
FIG. 4 is a view similar to FIG. 1 but shows a second embodiment.

FIG. 4 shows a second embodiment. In this embodiment, to the lower end of steering wheel 21 is provided steering angle sensor 70 for detecting a steering angle of steering wheel 21. Further, to the opposite ends of piston rod 30 are provided stroke sensors 57 and 58 for detecting the road surface input on the basis of an axial stroke of piston rod 30. Further, to the hydraulic cylinder 27 side conduit portions of first and second communication conduits 34 and 35 of hydraulic circuit 128 are provided pressure sensors 59 and 60 for detecting the internal pressures in first and second communication conduits 34 and 35 and thereby checking the road surface condition.

By this, it becomes possible to control oil pressure of hydraulic cylinder 27 by means of oil pump 37 more accurately.

Except for the above, this embodiment is substantially the same as the first embodiment and can produce substantially the same effect.

Figure 5:
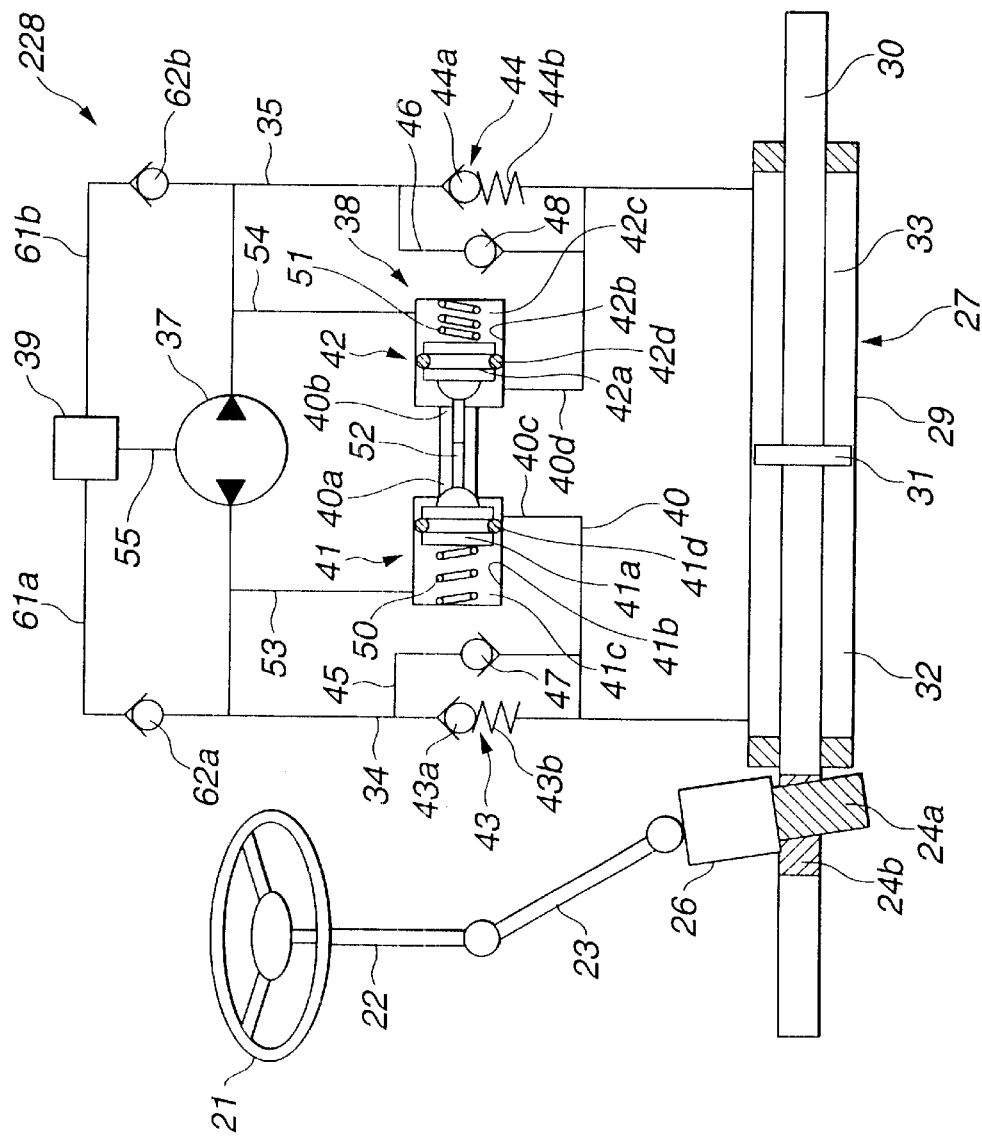
FIGS. 5 to 10 are views similar to FIG. 2 but show third to eighth embodiments, respectively.

FIG. 5 shows a third embodiment. In this embodiment, hydraulic circuit 228 is not provided with fifth conduit 49 (refer to FIG. 1) fluidly connecting between bypass conduit 40 and reservoir 39 but with extension conduits 61a and 61b for fluidly connecting between first communication conduit 34 and reservoir 39 and between second communication conduit 35 and reservoir 39, respectively. Further, to extension conduits 61a and 61b are provided check valves 62a and 62b for allowing flow of working oil only in one direction from the reservoir 39 side to the conduit 34 or 35 side.

By this embodiment, working oil within reservoir 39 can be supplementarily supplied to first and second communication conduits 34 and 35 other than oil pump 37. By this, it becomes possible to supplementarily supply working oil to the entire of hydraulic circuit 28 rapidly, thus making it possible to prevent cavitation not only within oil pump 37 but within first and second chambers 32 and 33.

Except for the above, this embodiment is substantially the same as the first embodiment and can produce substantially the same effect.

Figure 6:
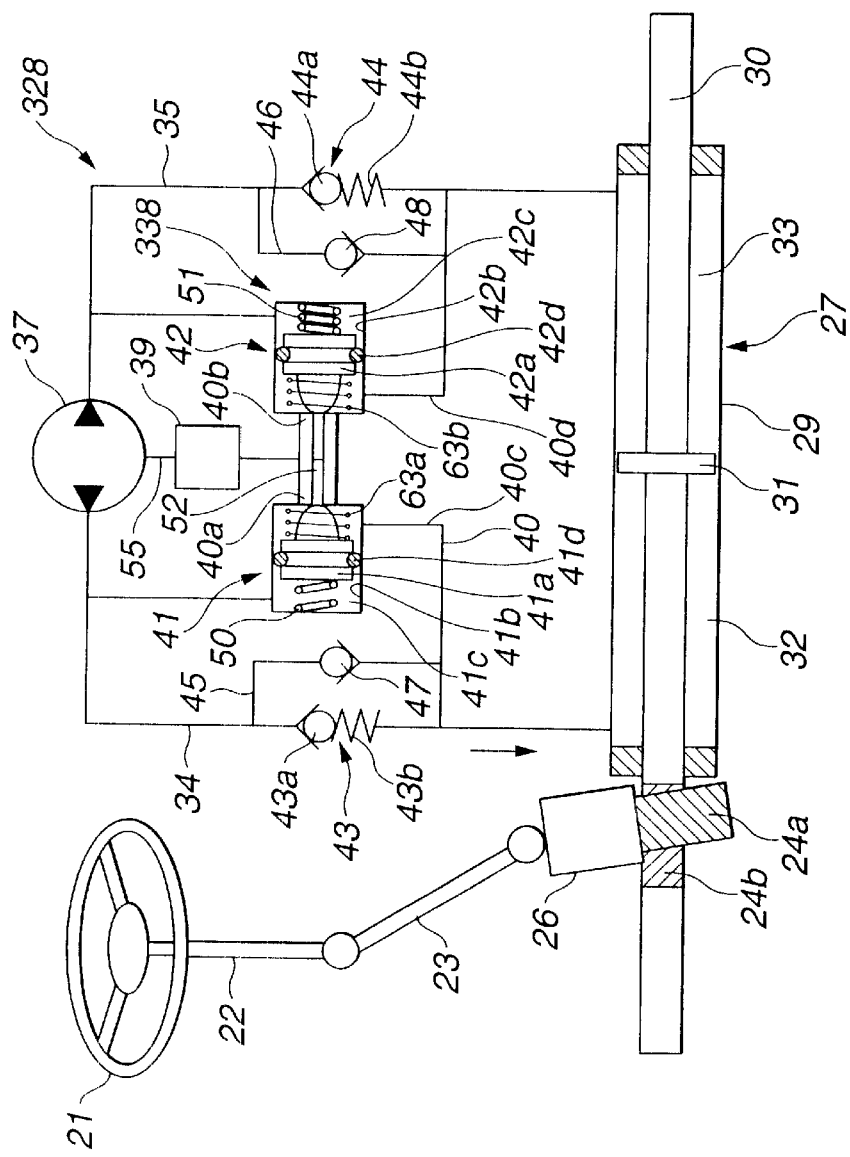

FIG. 6 shows a fourth embodiment. In this embodiment, hydraulic circuit 328 includes modified release mechanism 338. Namely, in addition to outer springs 50 and 51 for holding valve bodies 41a and 42a of poppet valves 41 and 42 at neutral positions, inner springs 63a and 63b are disposed in the front end portions of valve bores 41b and 42b. By this, valve bodies 41a and 42a are urged by inner springs 63a and 63b against the bias of springs 50 and 51, thus making it assured to hold valve bodies 41a and 42a at the neutral positions thereof when there is not any pressure differential across valve bodies 41a and 42a.

Accordingly, when oil pump 37 is inoperative, an operation for holding valve bodies 41a and 42a at the neutral positions can be performed more rapidly and assuredly, thus making it possible to hold valve bodies 41a and 42a at the neutral positions more stably.

Except for the above, this embodiment is substantially the same as the first embodiment and can produce substantially the same effect.

Figure 7:
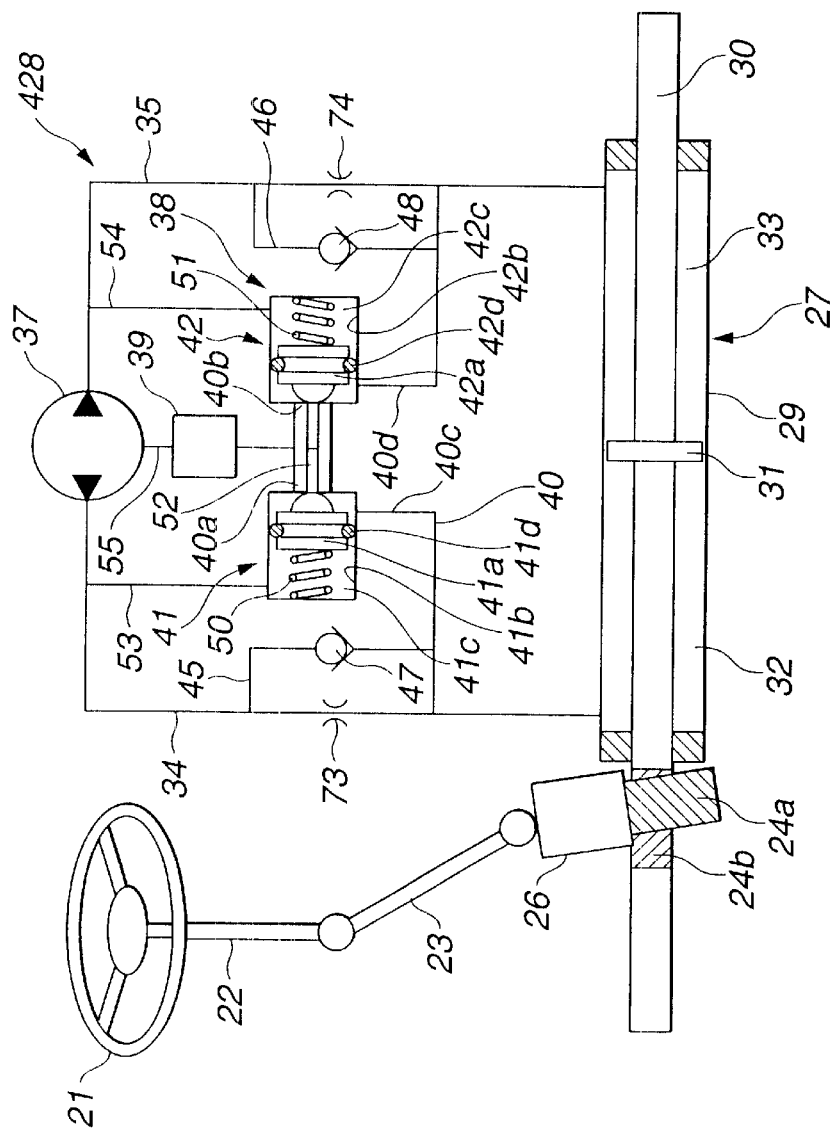

FIG. 7 shows a fifth embodiment. In this embodiment, the pressure differential generating devices of hydraulic circuit 428 are modified. Namely, the pressure differential generating devices are constituted by orifices 73 and 74 which restrict the cross sectional areas of first and second communication conduits 34 and 35, in place of pressure control valves 43 and 44 (refer to FIG. 1).

By orifices 73 and 74, a desired pressure differential can be obtained. Further, orifices 73 and 74 are simpler in structure as compared with pressure control valves 43 and 44 (refer to FIG. 1) and therefore can be produced easier and at lower cost.

Except for the above, this embodiment is substantially the same as the first embodiment and can produce substantially the same effect.

Figure 8:
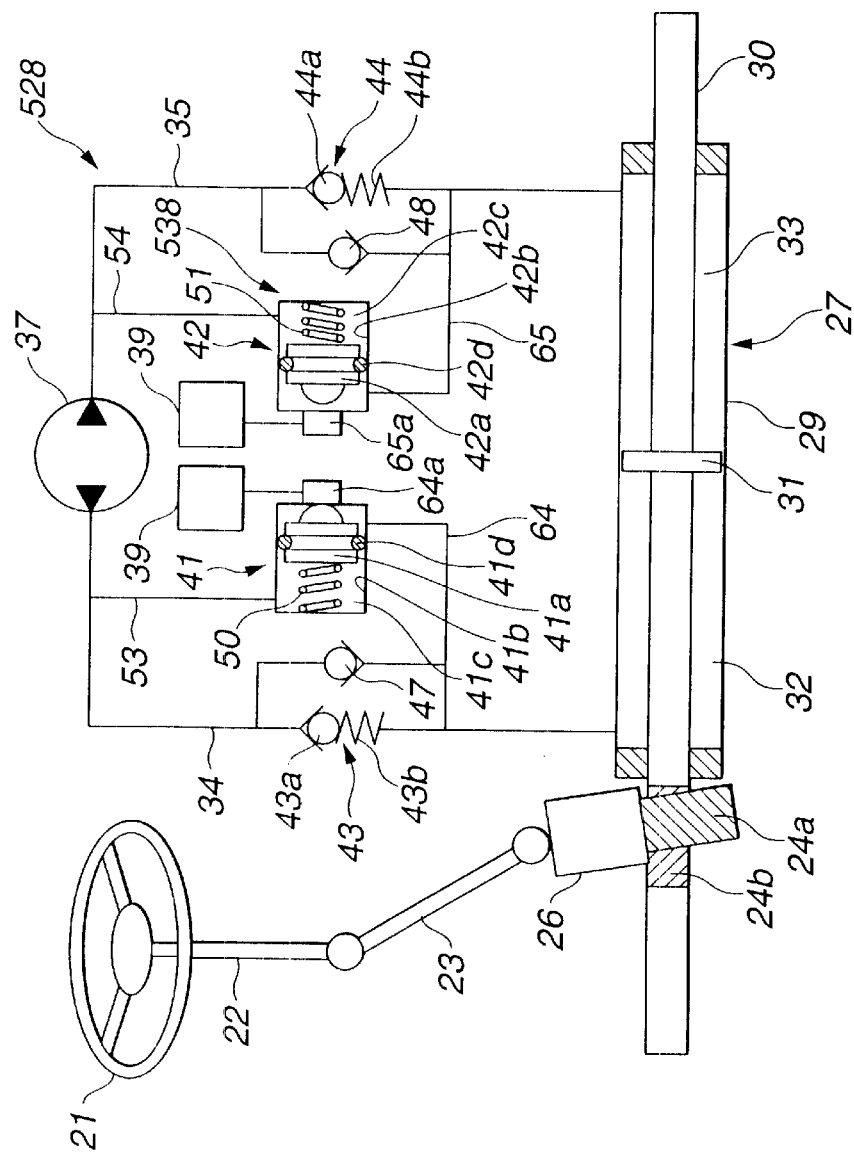

FIG. 8 shows a sixth embodiment. In this embodiment, hydraulic circuit 528 has modified release mechanism 538. Namely, continuous bypass conduit 40 (refer to FIG. 1) is divided into separate supply/discharge conduits 64 and 65. Supply/discharge conduits 64 and 65 have end portions to which reservoirs 39 and 39 are fluidly connected. Reservoirs 39 are not of closed type but of the type communicated with the atmosphere. Further, poppet valves 41 and 42 are separated so as to be movable independently from each other. Supply/discharge conduits 64 and 65 have at intermediate portions bypass conduit ports 64a and 65a which are opened and closed by poppet valves 41 and 42, respectively. In the meantime, valve bodies 41a and 42a of poppet valves 41 and 42 are urged by a small spring force of respective springs 50 and 51 in the direction to close bypass conduit ports 64a and 65a. However, springs 50 and 51 are not provided for urging valve bodies 41a and 42a to close bypass conduit ports 64a and 65a but for holding valve bodies 41a and 42a at the neutral positions thereof. Valve bodies 41a and 42a are moved to close bypass conduit ports 64a and 65a when a predetermined pressure differential acts across valve bodies 41a and 42a.

Accordingly, in case oil pump 37 is functioning properly, the operation of poppet valves 41 and 42 is controlled by the difference in pressure between the conduit portions of first and second communication conduits 34 and 35 upstream and downstream of pressure control valves 43 and 44. When oil pump 37 becomes inoperative, valve bodies 41a and 42a of poppet valves 41 and 42 are held in the neutral equilibrium positions where valve bodies 41a and 42a do not close bypass conduit ports 64a and 65a, under the bias of springs 50 and 51. Thus, working oil can be supplied to one of first and second chambers 32 and 33 under the supply of working oil from reservoir 39, whereas working oil can be discharged from the other of first and second chambers 32 and 33 and collected by reservoir 39, thus making it possible to attain such supply and discharge of working oil without increasing the flow resistance.

Except for the above, this embodiment is substantially the same as the first embodiment and can produce substantially the same effect.

Figure 9:
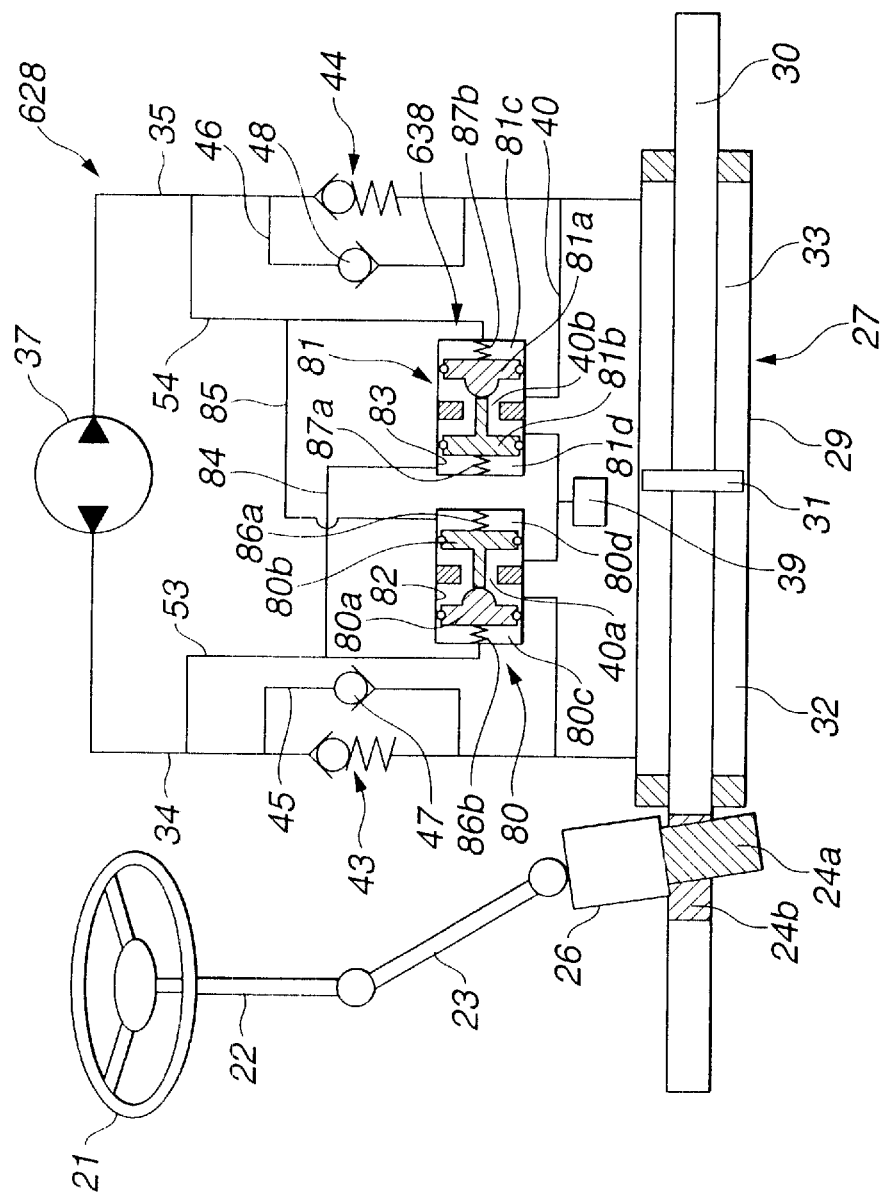

FIG. 9 shows a seventh embodiment. In this embodiment, hydraulic circuit 628 is modified to have modified release mechanism 638. Namely, poppet valves 41 and 42 (refer to FIG. 1) provided to the intermediate conduit portion of bypass conduit 40 are replaced by two independent control valves 80 and 81.

Control valves 80 and 81 include valve bores 82 and 83 disposed in bypass conduit 40 and annular walls (no numeral) disposed in valve bores 82 and 83 to constitute bypass conduit ports 40a and 40b which constitute part of bypass conduit 40 and which are opened and closed by valve bodies 80a and 81a. Valve bodies 80a and 81a are adapted to be pushed by pushers 80b and 81b in the direction to open bypass conduit ports 40a and 40b. Valve bores 82 and 83 have at the rear end portions thereof first and second pressure actuating chambers 80c and 81c to which working oil discharge from oil pump 37 is introduced by way of introduction conduits 53 and 54. Valve bores 82 and 83 further have at the front end portions thereof first and second pressure signal chambers 80d and 81d to which working oil is introduced from introduction conduits 54 and 53 by way of pressure signal conduits 85 and 84. Springs 86a, 86b, 87a and 87b are disposed in respective chambers 80d, 80c, 81c, 81d and 81c to serve as a holding device for holding, by way of pushers 80b and 81b, valve bodies 80a and 81a at the neutral positions, i.e., at positions for allowing bypass conduit ports 40a and 40b to open. Further, to an intermediate conduit portion of bypass conduit 40, which is located between control valves 80 and 81, is fluidly connected reservoir 39.

Accordingly, at normal leftward and rightward steering, for example, at rightward steering, working oil discharged from oil pump 37 is introduced through first communication conduit 34 and introduction conduit 53 into first pressure actuating chamber 80c, thus causing valve body 80a to move in the right-hand direction in FIG. 9 against the bias of spring 86b to close bypass conduit port 40a. By this, working oil discharged from oil pump 37 is drawn through first communication conduit 34 into first chamber 32. At the same time, working oil in second chamber 33 is discharged therefrom and drawn through fourth communication conduit 46 and check valve 48 into oil pump 37. Accordingly, piston rod 30 is caused to move in the left-hand direction in FIG. 9, thus producing an assist force for assisting a steering effort for turning steering wheel 21 to the right.

On the other hand, at leftward steering, oil pump 37 is driven in the reverse direction, thus causing valve body 81a to close bypass conduit port 40b by the effect of the oil pressure discharged from oil pump 37. By this, working oil is supplied to second chamber 33, thus producing an assist force for assisting a steering effort for turning steering wheel to the left.

Further, when oil pump 37 is inoperative, there is not any oil pressure supplied to pressure actuating chambers 80c and 81c. Thus, both valve bodies 80a and 81a are held at the neutral positions under the bias of springs 86a, 86b, 87a and 87b by way of pushers 80b and 81b, thus causing bypass conduit ports 40a and 40b to open and therefore bypass conduit 40 to be put into an open condition of providing communication between first and second communication conduits 34 and 35.

Except for the above, this embodiment is substantially the same as the first embodiment and can produce substantially the same effect.

Figure 10:
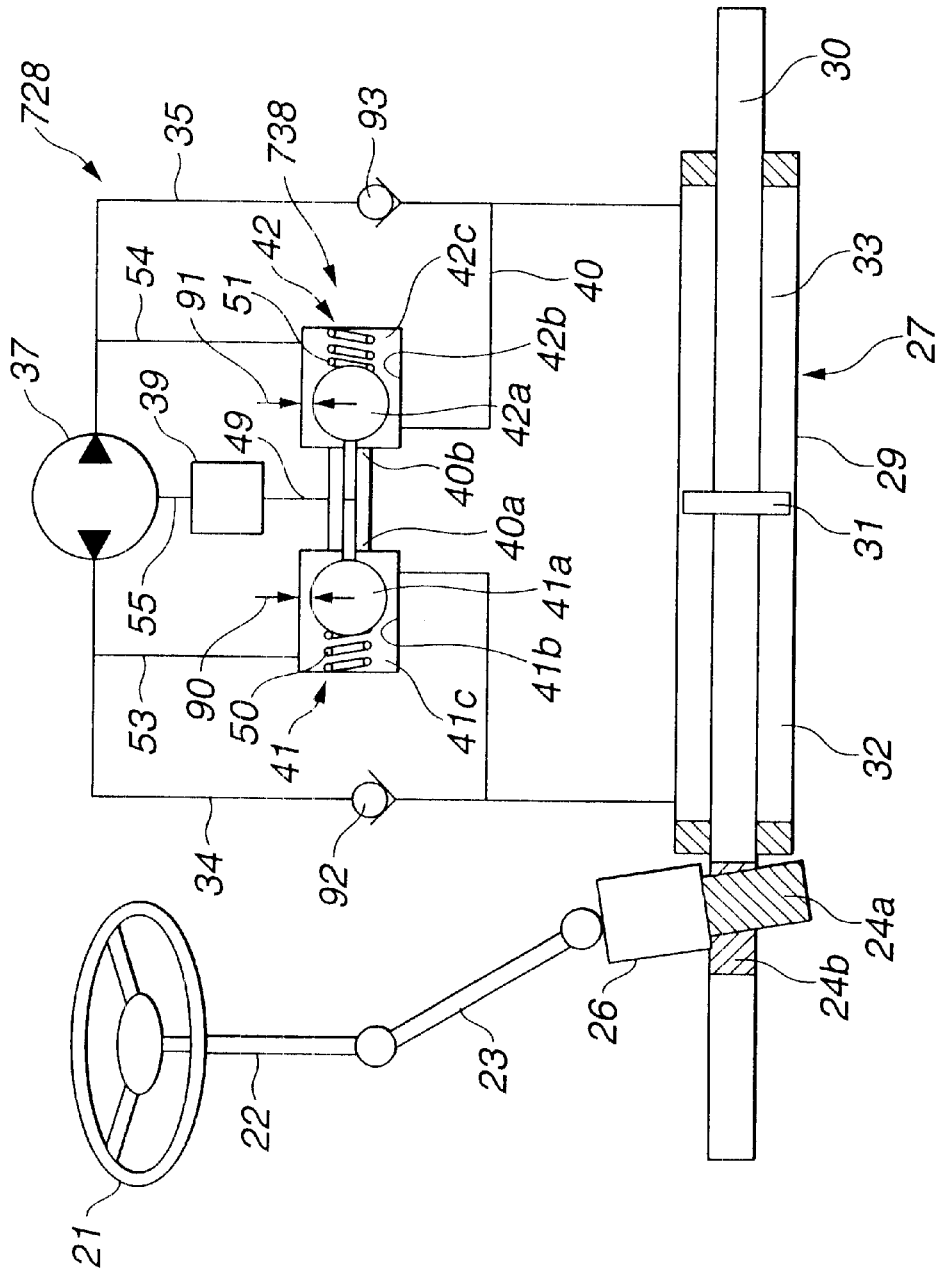

FIG. 10 shows an eighth embodiment. In this embodiment, hydraulic circuit 728 has modified release mechanism 738. Namely, valve bodies 41a and 42a of poppet valves 41 and 42 are formed into a spherical shape. Further, between the outer peripheral surfaces of valve bodies 41a and 42a and the inner circumferential surfaces of valve bores 41b and 42b are provided predetermined clearances 90 and 91 which are adapted to serve as conduits. Further, in first and second communication conduits 34 and 35 are disposed check valves 92 and 93 which allow flow of working oil only in one direction, i.e., in the direction from first and second chambers 32 and 33 of hydraulic cylinder 27 to oil pump 37.

Accordingly, when steering wheel 21 is turned, for example, to the left, working oil discharged from oil pump 37 which is driven in the forward direction is caused to flow through introduction conduit 53 into pressure actuating chamber 41c to urge valve body 41a in the right-hand direction in FIG. 10 and thereby close bypass conduit port 40a, while being caused to flow through clearance 90 into first chamber 32 of hydraulic cylinder 27. Simultaneously with this, working oil within second chamber 33 of hydraulic cylinder 27 is drawn into oil pump 37 through second communication conduit 35 and check valve 93.

At rightward steering, an operation reverse to that described as above is obtained for causing working oil to flow reversely.

Further, when oil pump 37 is inoperative, valve bodies 41a and 42a are held at the neutral positions by springs 50 and 51 within pressure actuating chambers 41c and 42c, thus causing bypass conduit ports 40a and 40b to open and therefore bypass conduit 40 to be put into an open condition of providing communication between first and second communication conduits 34 and 35. Thus, flow of working oil to and from first and second chambers 32 and 33 can be attained without causing a large flow resistance. As a result, a large increase of steering effort for turning steering wheel 21 can be prevented, thus making it possible to prevent the steering feel from being deteriorated.

Except for the above, this embodiment is substantially the same as the first embodiment and can produce substantially the same effect.

Figure 11:
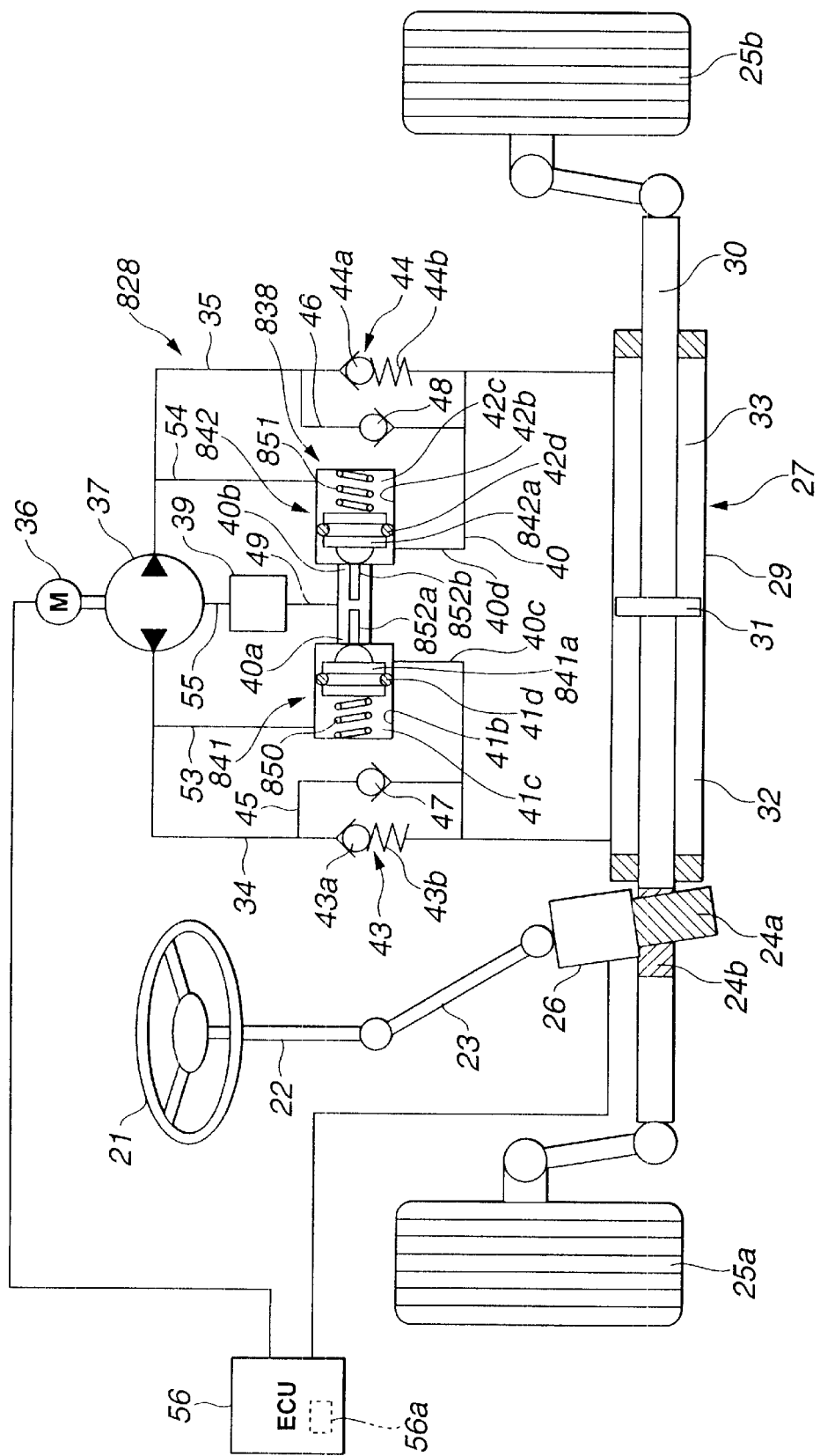
FIG. 11 is a view similar to FIG. 1 but shows a ninth embodiment.

FIG. 11 shows a ninth embodiment. In this embodiment, hydraulic circuit 828 has modified release mechanism 838. Namely, a pair of poppet valves 841 and 842 are provided which include tension springs 850 and 851 adapted to urge valve bodies 841a and 842a in the directions to open bypass conduit ports 40a and 40b, i.e., toward the neutral equilibrium positions, respectively. Valve bodies 841a and 842a have stoppers 852a and 852b in the form of a stem or cylindrical post and protruding from the semispherical valve body portions. Stoppers 852a and 852b are disposed so as to have free ends facing and spaced apart from each other when valve bodies 841a and 842a are in the neutral positions shown in FIG. 11.

Stoppers 852a and 852b are adapted to abut upon each other at the free ends when one of valve bodies 841a and 842a are brought into contact with one of bypass conduit ports 40a and 40b to close bypass conduit 40. Stoppers 852a and 852b are adapted to provide such a control that when one of bypass conduit ports 40a and 40b is in a closed condition the other is not put into a closed condition. Namely, stoppers 852a and 852b are adapted to abut upon each other at free ends thereof for thereby preventing bypass conduit ports 40a and 40b from being closed simultaneously or all at once. Valve bodies 841a and 842a with stoppers 852a and 852b have the same shape.

Further, ECU 56 is provided with abnormal judging section 56a for judging that something abnormal has occurred in the power steering system when a steering force acting on steering shaft 22 and detected by detecting device 26 is equal to or larger than a predetermined value. Though not shown, abnormal judging section 56a is connected to a warning lamp or warning sound producing device that informs a driver of an abnormality. By this, an abnormality of the power steering system can be recognized by the driver assuredly other than may be recognized depending upon a variation of a steering feel.

Figure 12:
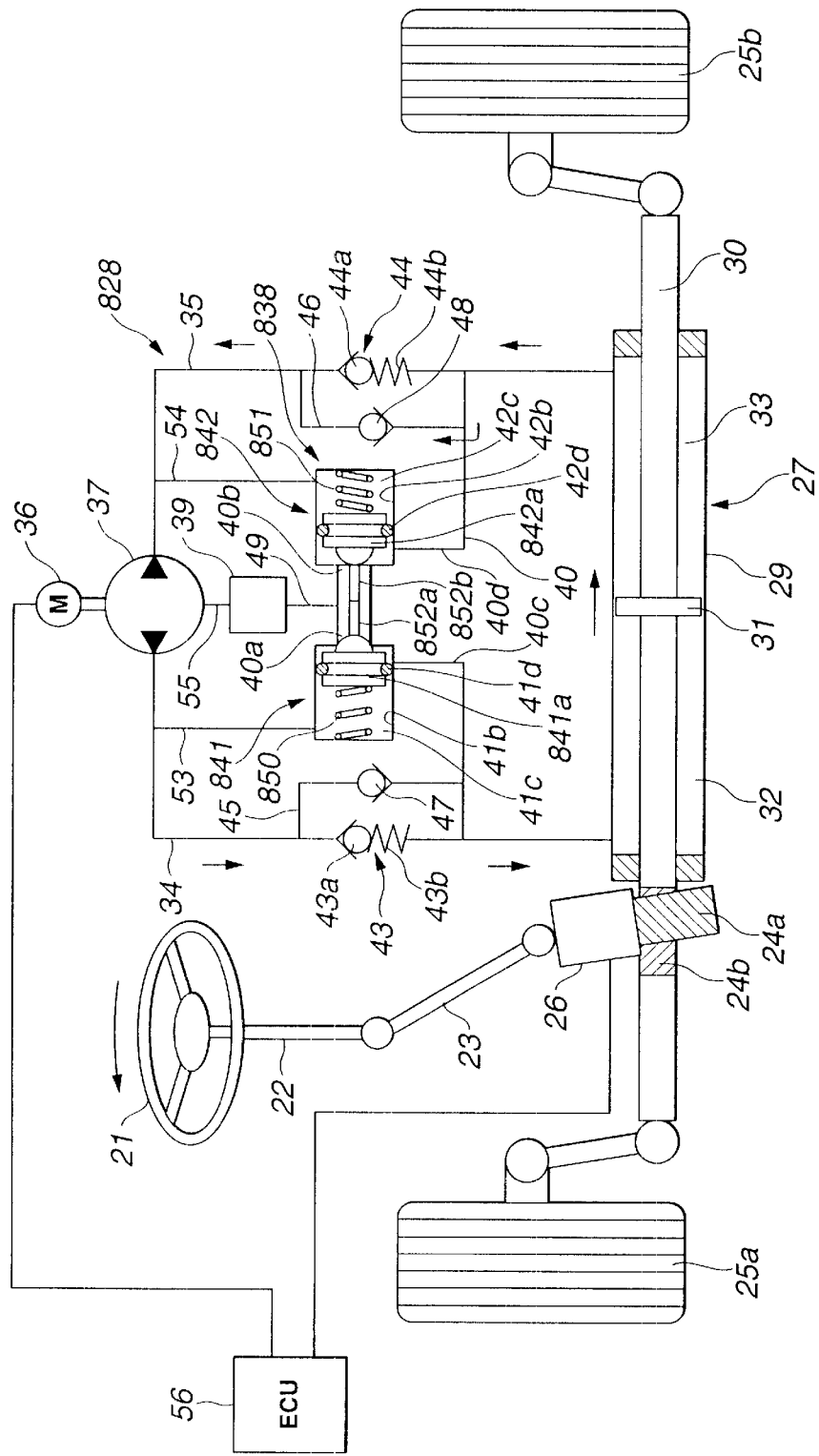
FIG. 12 is a view for illustrating an operation of the power steering system of FIG. 11 when a steering wheel is turned to the left.
Figure 13:
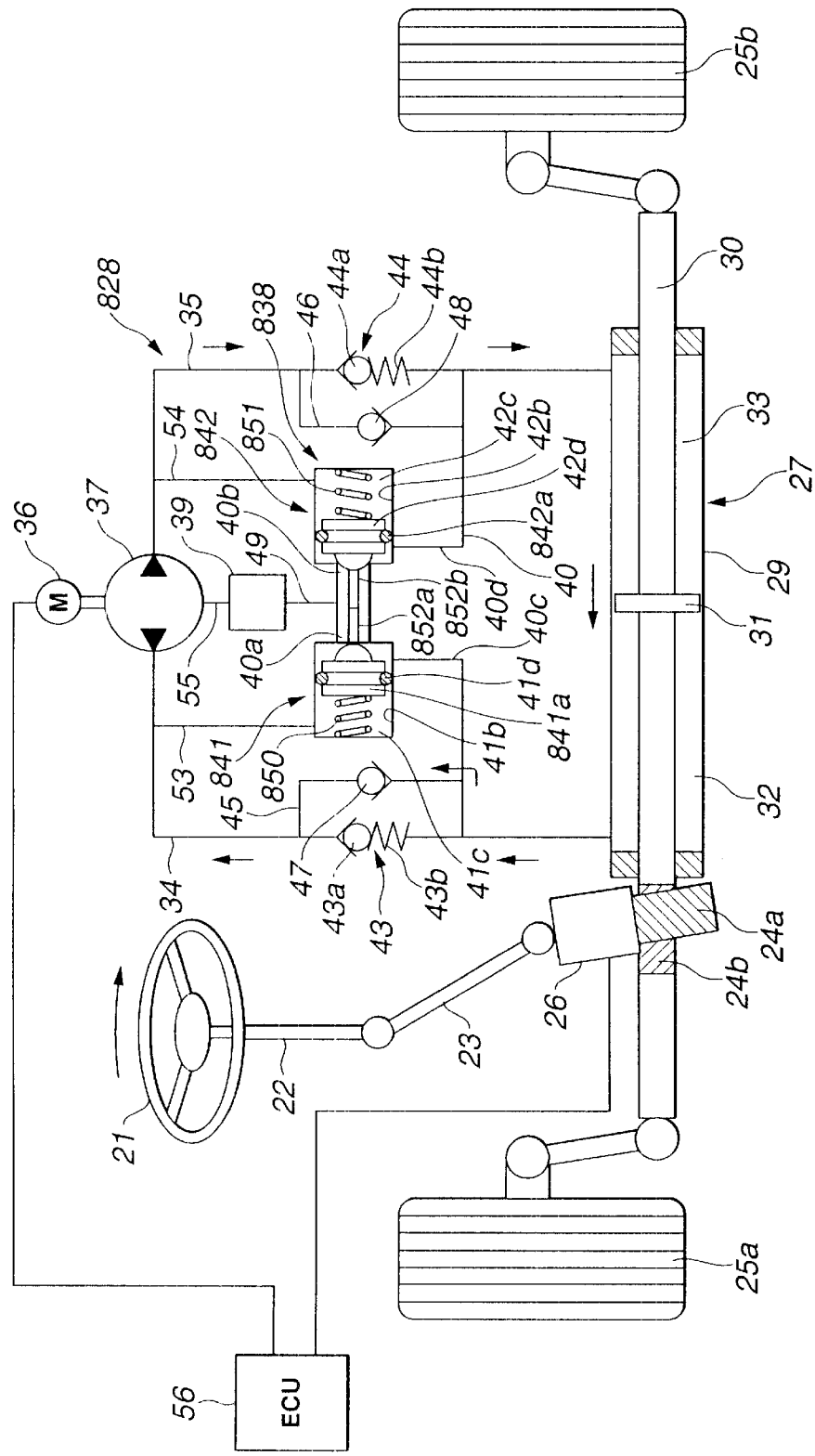
FIG. 13 is a view for illustrating an operation of the power steering system of FIG. 11 when the steering wheel is turned to the right.
Figure 14:
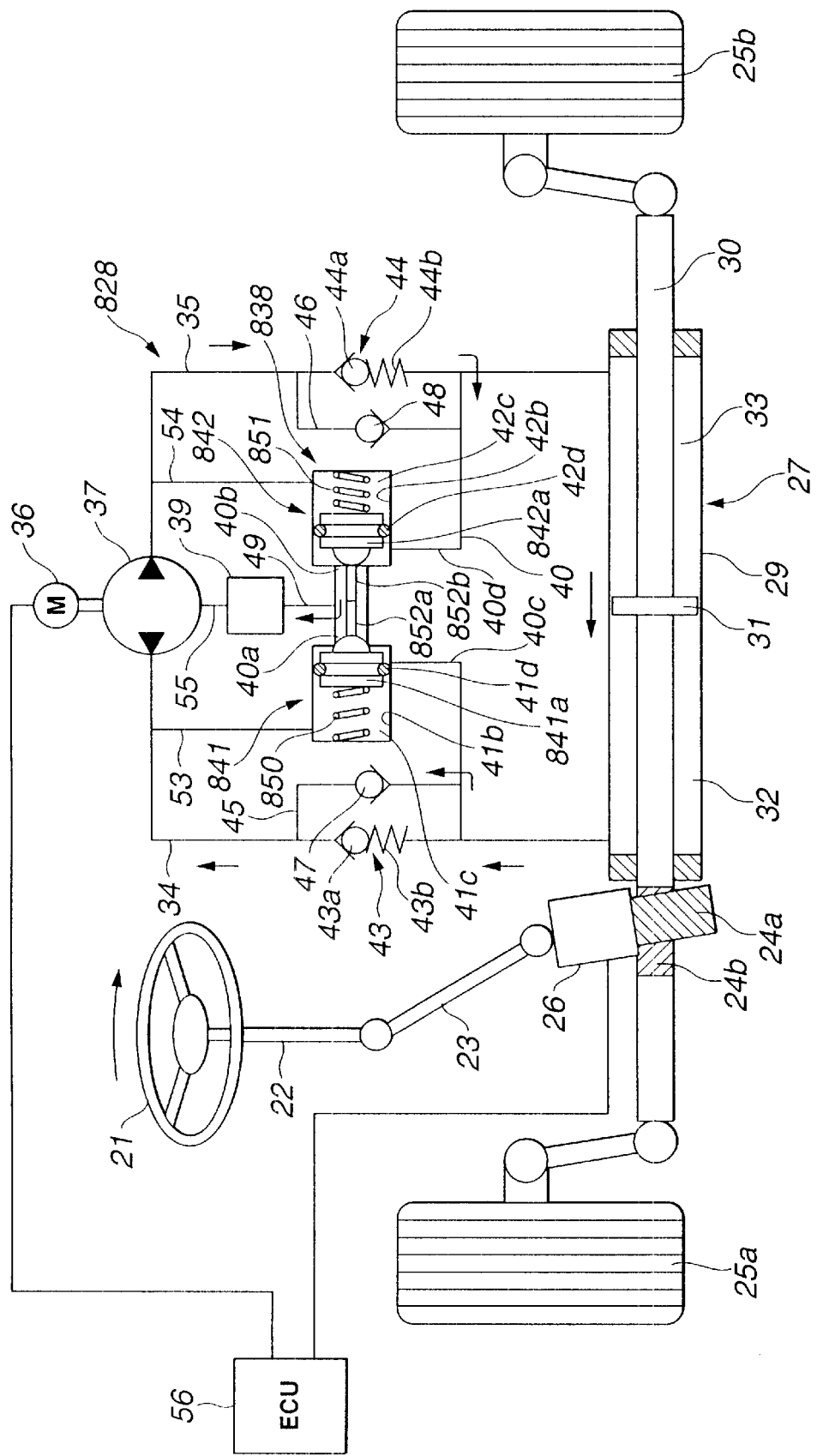
FIG. 14 is a view similar to FIG. 12 but shows the power steering system in a condition of malfunctioning.

In operation, when steering wheel 21 is turned to the left as shown in FIG. 12, valve body 841a closes bypass conduit port 40a and brings stopper 852a into contact with stopper 852b of valve body 842a. When steering wheel 21 is turned to the right as shown in FIG. 13, valve body 842a closes bypass conduit port 40b and brings stopper 852b into contact with stopper 852a. When one of poppet valves 841 and 842 is locked, for example, valve body 841a is locked in a condition of closing bypass conduit port 40a as shown in FIG. 14, bypass conduit port 40b is held open since stoppers 852a and 852b are brought into contact at free ends thereof.

In this embodiment, valve bodies 841a and 842a with stoppers 852a and 852b have the same shape and therefore can be of common parts, thus making it possible to reduce the cost.

Further, valve bodies 841a and 842a are not always engaged with each other at stoppers 852a and 852b but poppet valves 841 and 842 are operated independently when the power steering system is in a normal condition. Thus, friction and the bias of valve springs 850 and 851 act upon valve bodies 841a and 842a, independently. Valve bodies 841a and 842a can therefore operate smoothly, thus making it possible to improve the responsiveness of poppet valves 841 and 842.

Except for the above, this embodiment is substantially the same as the first embodiment and can produce substantially the same effect.

Figure 15:
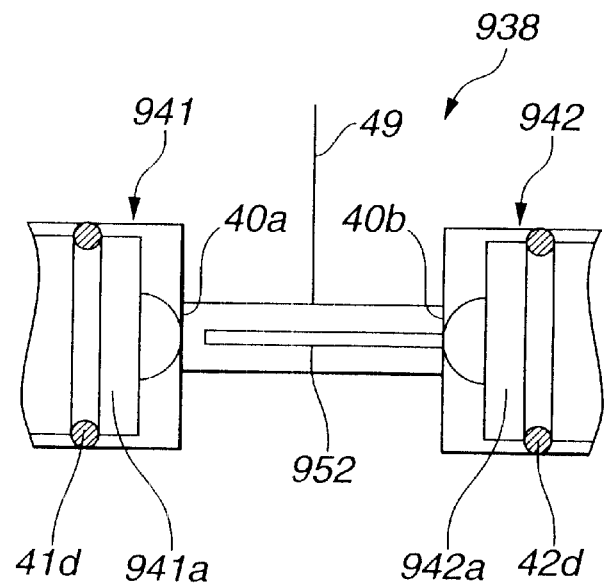
FIG. 15 is an enlarged view of an important portion of a power steering system according to a tenth embodiment.

FIG. 15 shows a tenth embodiment. In this embodiment, valve body 941a of poppet valve 941 of release mechanism 938 is not provided with a stopper but valve body 942a of poppet valve 942 is provided with a stopper 952. When poppet valve 941 or 942 closes bypass conduit port 40a or 40b, stopper 952a is caused to abut at the free end thereof upon the semispherical valve body portion of poppet valve 942 or 941.

Except for the above, this embodiment is substantially the same as the ninth embodiment and can produce substantially the same effect.

The entire contents of Japanese Patent Applications P2000-353725 (filed Nov. 21, 2000) and P2001-268825 (filed Sep. 5, 2001) are incorporated herein by reference.

Figure 16:
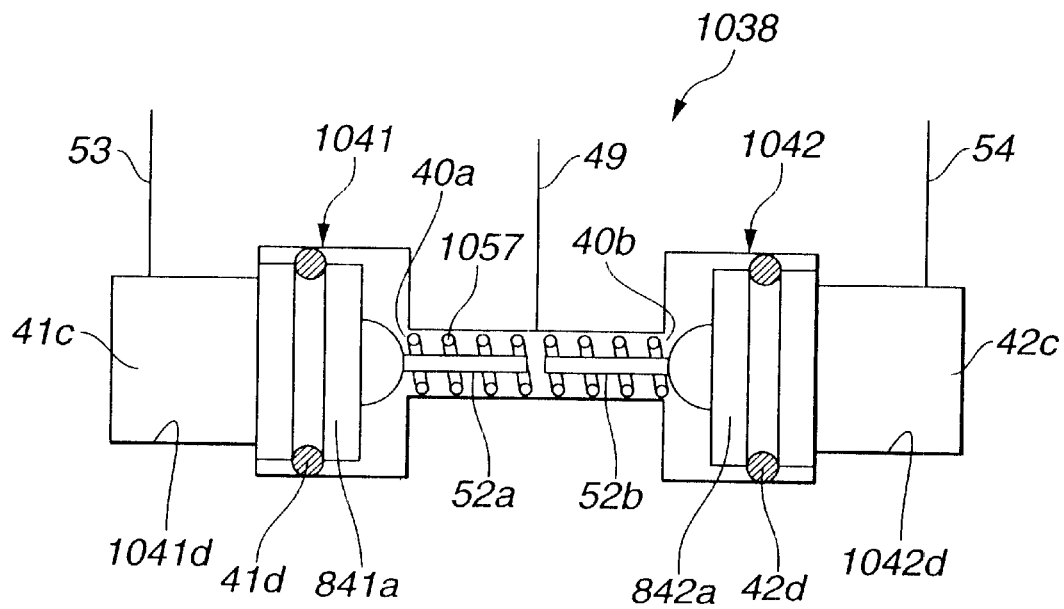
FIG. 16 is an enlarged view of an important portion of a power steering system according to an eleventh embodiment.

Although the invention has been described above by reference to certain embodiments of the invention, the invention is not limited to the embodiments described above. Modifications and variations of the embodiments described above will occur to those skilled in the art, in light of the above teachings. For example, tension springs 850 and 851 (refer to FIG. 11) can be compression springs. Further, as shown in FIG. 16, modified release mechanism 1038 may be employed. In modified release mechanism 1038, a pair of tension springs 850 and 851 (refer to FIG. 11) can replaced by single compression spring 1057 interposed between valve bodies 841a and 842a. In this instance, valve bores 1041d and 1042d are stepped so as to have shoulders with which valve bodies 841a and 842a are brought into contact under the bias of spring 1057. The scope of the invention is defined with reference to the following claims.

What is claimed is:

1. A power steering system for a vehicle comprising:
   a hydraulic pressure source;
   a hydraulic cylinder having first and second chambers and driven in accordance with a pressure differential between a pressure fluid supplied to the first chamber and that to the second chamber;

first and second communication conduits connecting the first and second chambers of the hydraulic cylinder to the hydraulic pressure source, respectively;

a controller for selectively switching a supply direction of the pressure fluid from the hydraulic pressure source to the first and second chambers of the hydraulic cylinder in response to a steering operation of a steering wheel;

a bypass conduit connecting between the first and second communication conduits and having first and second bypass conduit ports; and first and second valves disposed in the bypass conduit for selectively opening and closing, in response to the pressure fluid from the hydraulic pressure source, the first and second bypass conduit ports in such a manner that the pressure fluid from the hydraulic pressure source is supplied to the first chamber of the hydraulic cylinder while the pressure fluid in the second chamber of the hydraulic cylinder is discharged therefrom when the first valve is in a position of closing the first bypass conduit port and the second valve is in a position of opening the second bypass conduit port and the pressure fluid from the hydraulic pressure source is supplied to the second chamber of the hydraulic cylinder while the pressure fluid in the first chamber of the hydraulic cylinder is discharged therefrom when the first valve is in a position of opening the first bypass conduit port and the second valve is in a position of closing the second bypass conduit port;

the first and second valves being placed in the positions of opening the first and second bypass conduit ports and thereby providing communication between the first and second communication conduits when the hydraulic pressure source is inoperative.

2. A power steering system according to claim 1, further comprising a holding device for holding the first and second valves at the positions of opening the first and second bypass conduit ports when the hydraulic pressure source is inoperative.

3. A power steering system according to claim 2, wherein the holding device comprises springs for urging the valves toward the positions of opening the bypass conduit ports, respectively.

4. A power steering system according to claim 1, further comprising a reservoir disposed upstream of the hydraulic pressure source for collecting system fluid.

5. A power steering system according to claim 4, wherein the reservoir collects system fluid leaking from the hydraulic pressure source.

6. A power steering system according to claim 4, wherein when the hydraulic pressure source is inoperative, the first and second chambers of the hydraulic cylinder are communicated with the reservoir through the first and second valves held in the positions of opening the first and second bypass conduit ports.

7. A power steering system according to claim 1, wherein the hydraulic pressure source comprises a fluid pump driven to rotate in a forward direction for supplying the pressure fluid to the first communication conduit and in a reverse direction for supplying the pressure fluid to the second communication conduit.

8. A power steering system according to claim 1, further comprising pressure differential generating devices disposed in the respective first and second communication conduits for generating pressure differentials by which the first and second valves are opened and closed.

9. A power steering system according to claim 8, wherein each of the pressure differential generating devices comprises a pressure control valve.

10. A power steering system according to claim 8, wherein each of the pressure differential generating devices comprises an orifice.

11. A power steering system according to claim 8, further comprising third and fourth communication conduits provided to the first and second communication conduits in a way as to bypass the differential pressure generating devices, respectively and check valves disposed in the third and fourth communication conduits for allowing flow of the pressure fluid only in one direction from the first and second chambers of the hydraulic cylinder to the hydraulic pressure source, respectively.

12. A power steering system according to claim 1, wherein the first and second valves are in the form of poppet valves and comprise valve bodies and a connecting rod, the valve bodies being connected by the connecting rod so as to constitute an integral unit.

13. A power steering system according to claim 1, wherein the first and second valves are in the form of poppet valves and comprise valve bodies axially aligned and axially movable toward and away from each other, the valve bodies having stem portions which are brought into contact with each other when one of the first and second valves is in the position of closing corresponding one of the first and second bypass conduit ports.

14. A power steering system according to claim 1, wherein the first and second valves are in the form of poppet valves and having valve bodies axially aligned with each other and movable independently, one of the valve bodies having an abutment abuttingly engageable with the other of the valve bodies for thereby controlling a distance between main body portions of the valve bodies in a way as to prevent the first and second valves from closing the bypass conduit ports all at once.

15. A power steering system according to claim 14, wherein the other of the valve bodies has an abutment abuttingly engageable with one of the valve bodies, the first and second valves having the same shape.

16. A power steering system according to claim 14, further comprising pressure differential generating devices disposed in the first and second communication conduits, respectively, the first and second valves controlling opening and closing of the bypass conduit in response to fluid pressures in conduit portions of the first and second communication conduits upstream of the pressure differential generating devices.

17. A power steering system according to claim 1, further comprising a detecting device for detecting a steering force applied to the steering wheel, and an abnormality judging device for judging that an abnormality has occurred in the power steering system when a steering force detected by the detecting device is equal to or larger than a predetermined value.

18. A power steering system for a vehicle comprising:
a double-acting hydraulic cylinder for controlling the direction of a pair of wheels of the vehicle, the hydraulic cylinder having first and second chambers and driven in accordance with a pressure differential between a pressure fluid supplied to the first chamber and that to the second chamber; and a hydraulic circuit for controlling supply and discharge of pressure fluid to and from the first and second chambers of the hydraulic cylinder, the hydraulic circuit including:

a hydraulic pressure source;

a reservoir; and a pair of first and second valves, the first valve being disposed between the first chamber of the hydraulic cylinder and the reservoir for providing communication therebetween when open and thereby allowing discharge of the pressure fluid from the first chamber of the hydraulic cylinder and obstructing communication therebetween when closed and thereby allowing supply of the pressure fluid from the hydraulic pressure source to the first chamber, the second valve being disposed between the second chamber of the hydraulic cylinder and the reservoir for providing communication therebetween when open and thereby allowing discharge of the pressure fluid from the second chamber of the hydraulic cylinder and obstructing communication therebetween when closed and thereby allowing supply of the pressure fluid from the hydraulic pressure source to the second chamber of the hydraulic cylinder;

the first and second valves being opened to communicate the first and second chambers of the hydraulic cylinder with the reservoir when the hydraulic pressure source is inoperative.

19. A power steering system according to claim 18, wherein the hydraulic pressure source comprises a reversible pump, the hydraulic circuit including first and second communication conduits connecting the reversible pump to the first and second chambers of the hydraulic cylinder, respectively and a bypass conduit connecting between the first and second communication conduits, the first and second valves being disposed in the bypass conduit.

20. A power steering system according to claim 19, further comprising a controller for selectively switching a driving direction of the reversible pump for thereby selectively supplying the pressure fluid from the reversible pump to one of the first and second communication conduits.

21. A power steering system according to claim 20, wherein the hydraulic circuit comprises pressure reducing valves disposed in the first and second communication conduits, respectively, for producing a pressure differential across the pressure reducing valves, the first and second valves being opened and closed for thereby opening and closing the bypass conduit in response to the pressure differentials produced by the pressure reducing valves.

22. A power steering system according to claim 21, wherein the bypass conduit has first and second bypass conduit ports which are opened and closed by the first and second valves, respectively.

23. A power steering system according to claim 22, wherein the first and second valves are in the form of poppet valves and axially aligned with each other, the first and second valves having valve bodies and a connecting rod, the valve bodies being connected by the connecting rod so as to constitute an integral unit.

24. A power steering system according to claim 22, wherein the first and second valves are in the form of poppet valves and comprise valve bodies axially aligned with each other and movable independently, the valve bodies having stem portions which are brought into contact with each other when one of the first and second valves is in the position of closing corresponding one of the first and second bypass conduit ports.

* * * * *